US011904283B2

(12) United States Patent
Peterman et al.

(10) Patent No.: US 11,904,283 B2
(45) Date of Patent: Feb. 20, 2024

(54) VOLATILES CAPTURE EDUCATOR SYSTEM

(71) Applicants: John M. Peterman, Troy, MO (US); Mark A. Roberts, St. Charles, MO (US); Mark J. Burke, St. Peters, MO (US)

(72) Inventors: John M. Peterman, Troy, MO (US); Mark A. Roberts, St. Charles, MO (US); Mark J. Burke, St. Peters, MO (US)

(73) Assignee: GPRE IP LLC, St. Louis, MO (US)

( * ) Notice: Subject to any disclaimer, the term of this patent is extended or adjusted under 35 U.S.C. 154(b) by 323 days.

(21) Appl. No.: 16/974,375

(22) Filed: Jun. 25, 2021

(65) Prior Publication Data

US 2022/0370968 A1 Nov. 24, 2022

Related U.S. Application Data

(60) Provisional application No. 63/044,459, filed on Jun. 26, 2020.

(51) Int. Cl.
*F23G 5/50* (2006.01)
*B01F 23/10* (2022.01)
(Continued)

(52) U.S. Cl.
CPC .......... *B01F 23/191* (2022.01); *B01F 23/811* (2022.01); *B01F 25/31243* (2022.01); *B01F 35/187* (2022.01); *B01F 35/2111* (2022.01); *B01F 35/2115* (2022.01); *B01F 35/21111* (2022.01); *B01F 35/21151* (2022.01); *B01F 35/222* (2022.01); *B01F 35/2211* (2022.01); *B01F 35/2218* (2022.01);
(Continued)

(58) Field of Classification Search
CPC . B01F 35/222; B01F 23/191; B01F 35/21111; B01F 23/811; B01F 35/21151; B01F 35/2115; B01F 25/31243; B01F 35/2211; B01F 35/187; B01F 35/2111; B01F 35/2218; F23N 1/022; F23G 5/50; F23G 5/46; F23G 7/065; F23G 7/06; C22B 7/001; C22B 7/003; C22B 21/0092; F27D 13/002
See application file for complete search history.

(56) References Cited

U.S. PATENT DOCUMENTS 4,010,935 A * 3/1977 Stephens ................... F27B 3/28
266/155
5,059,116 A * 10/1991 Gillespie ............... F27D 17/004
432/106
(Continued)

*Primary Examiner* — Alfred Basichas
(74) *Attorney, Agent, or Firm* — Churovich Law, LLC; Douglas D. Churovich, Esq.

(57) ABSTRACT

A volatiles consuming eductor system for coated scrap metal furnaces with separate delacquering and melt chambers. Motive gas is forced through an inlet into a mixing chamber in a direction opposite a suction port, creating a Venturi that draws gases from the delaquering chamber through the mixing chamber. The motive gas and the drawn gases mix and are forced through a discharge port, ignited, and injected into the melt chamber to help heat the melt chamber. A computer monitors process conditions and controls a regulator that adjusts the motive gas flow in response to those conditions.

20 Claims, 7 Drawing Sheets

(51) Int. Cl.
    *C22B 7/00*          (2006.01)
    *F23G 7/06*          (2006.01)
    *F23N 1/02*          (2006.01)
    *B01F 25/312*       (2022.01)
    *B01F 35/00*        (2022.01)
    *B01F 35/221*       (2022.01)
    *B01F 35/21*        (2022.01)
    *B01F 35/222*       (2022.01)
    *B01F 23/80*        (2022.01)
    *C22B 21/00*        (2006.01)
    *F27D 13/00*        (2006.01)
    *B01F 101/45*       (2022.01)
    *B01F 101/00*       (2022.01)

(52) U.S. Cl.
    CPC .............. *C22B 7/001* (2013.01); *C22B 7/003* (2013.01); *C22B 21/0092* (2013.01); *F23G 5/50* (2013.01); *F23G 7/06* (2013.01); *F23G 7/065* (2013.01); *F23N 1/022* (2013.01); *F27D 13/002* (2013.01); *B01F 2101/45* (2022.01); *B01F 2101/501* (2022.01); *F23N 2225/08* (2020.01); *F23N 2235/02* (2020.01); *F23N 2235/16* (2020.01)

(56) References Cited

U.S. PATENT DOCUMENTS

| | | | | |
|---|---|---|---|---|
| 5,540,752 | A * | 7/1996 | Spoel | C22B 9/05 |
| | | | | 75/10.21 |
| 6,227,847 | B1 * | 5/2001 | Gillespie | F23G 7/066 |
| | | | | 432/106 |
| 11,635,258 | B2 * | 4/2023 | Peterman | F27D 17/002 |
| | | | | 266/158 |
| 11,767,575 | B2 * | 9/2023 | Peterman | C22B 9/02 |
| | | | | 266/204 |
| 11,835,295 | B2 * | 12/2023 | Peterman | C22B 21/0092 |

\* cited by examiner

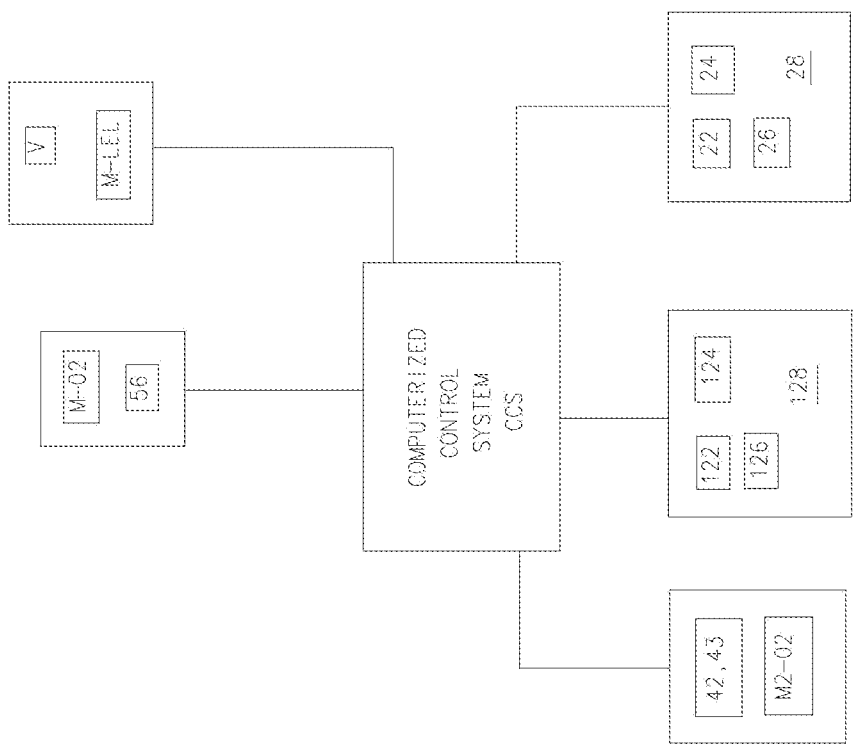

VOLATILES CAPTURE EDUCATOR SYSTEM

CROSS REFERENCE TO RELATED APPLICATIONS

This application derives and claims priority from U.S. provisional application 63/044,459 filed 26 Jun. 2020, which application is incorporated herein by reference.

STATEMENT REGARDING FEDERALLY SPONSORED RESEARCH OR DEVELOPMENT

Not applicable.

BACKGROUND OF THE INVENTION

This invention relates principally to a metal furnace or kiln, and more particularly to an eductor system for a coated aluminum scrap melting furnace that collects organic and particulate volatiles off-gassing from aluminum scrap located in the furnace's coated scrap hearth (i.e., delacquering) chamber and directs those volatiles into the melt zone (i.e., heating) chamber of the furnace to provide additional process burn fuel and reduce the quantity of waste exhaust pollutants.

It has for some time been a standard practice to recycle scrap metals, and in particular scrap aluminum. Various furnace and kiln systems exist that are designed to recycle and recover aluminum from various sources of scrap, such as used beverage cans ("UBC"), siding, windows and door frames, etc. One of the first steps in these processes is to use a rotary kiln to remove the paints, oils, and other surface materials (i.e., volatile organic compounds or "VOC's") on the coated scrap aluminum (i.e. "feed material"). This is commonly known in the industry as "delacquering." Delacquering is typically performed in an atmosphere with reduced oxygen levels and with temperatures in excess of 900 degrees Fahrenheit. However, the temperature range at which the paints and oils and other surface materials are released from the aluminum scrap in the form of unburned volatile gases typically ranges between 450 and 600 degrees Fahrenheit, which is generally known as the "volatilization point" or "VOL." The delaquering chamber may be run as hot as 900 degrees Fahrenheit to ensure that sufficient heat is transferred throughout the scrap load to achieve an internal temperature of at least 450 degrees Fahrenheit.

In various such metal recycling systems, the furnace comprises multiple compartments or chambers to accommodate serial steps in the recycle process. For example, for aluminum scrap that is coated with paints and various other surface materials, it is typical to remove such coatings from the scrap aluminum before the aluminum is actually melted. Thus, in a simplistic model, such an aluminum recycle system will require at least two chambers—one for delacquering and one for actual melt purposes. Moreover, it has been recognized that the VOC's outgassed or delacquered from the scrap metal can be recaptured in gaseous form and used as a burn fuel to thereafter help melt the scrap metal in the melt chamber. However, traditional aluminum delacquering-melt furnaces that seek to utilize outgassed VOC's for fuel simply collect and route the VOC's from the interior of the scrap metal delacquering chamber and funnel them into the melt chamber using a complicated system of electric fans and valves, which includes various electric fans positioned in air ducts that extend from the delaquering chamber to the melt chamber. While such a configuration or system may accomplish the task of collecting the VOC's and redirecting them into the melt chamber for burning, substantial problems with this configuration have been encountered.

First, because the electric fans and valves are exposed to the harsh and corrosive VOC's at elevated temperatures, the fans and valves exhibit very high and repeated failure rates, sometimes on the order of multiple times in a week. In addition, such fan and valve "systems" provide no monitoring or control over the supply and ignition of the VOC's redirected from the delacquering chamber and entering the melt chamber. As a consequence, combustion of the VOC's can be incomplete or sporadic, and can result in inconsistent heating in the melt chamber and resultant exhaust and pollution concerns.

It would therefore be desirable to have a system for an aluminum melt furnace that could collect VOC's from the delacquering chamber and redirect such VOC's to the furnace melt chamber, all in a monitored and controlled fashion. As will become evident in this disclosure, the present invention provides such benefits over the existing art.

BRIEF DESCRIPTION OF THE DRAWINGS

The illustrative embodiments of the present invention are shown in the following drawings which form a part of the specification:

FIG. 7 is a schematic computer system flow chart of the computer control system for the furnace of the present disclosure in association with various system control loops.

Corresponding reference characters indicate corresponding parts throughout the several views of the drawings.

DETAILED DESCRIPTION

Figure 1:
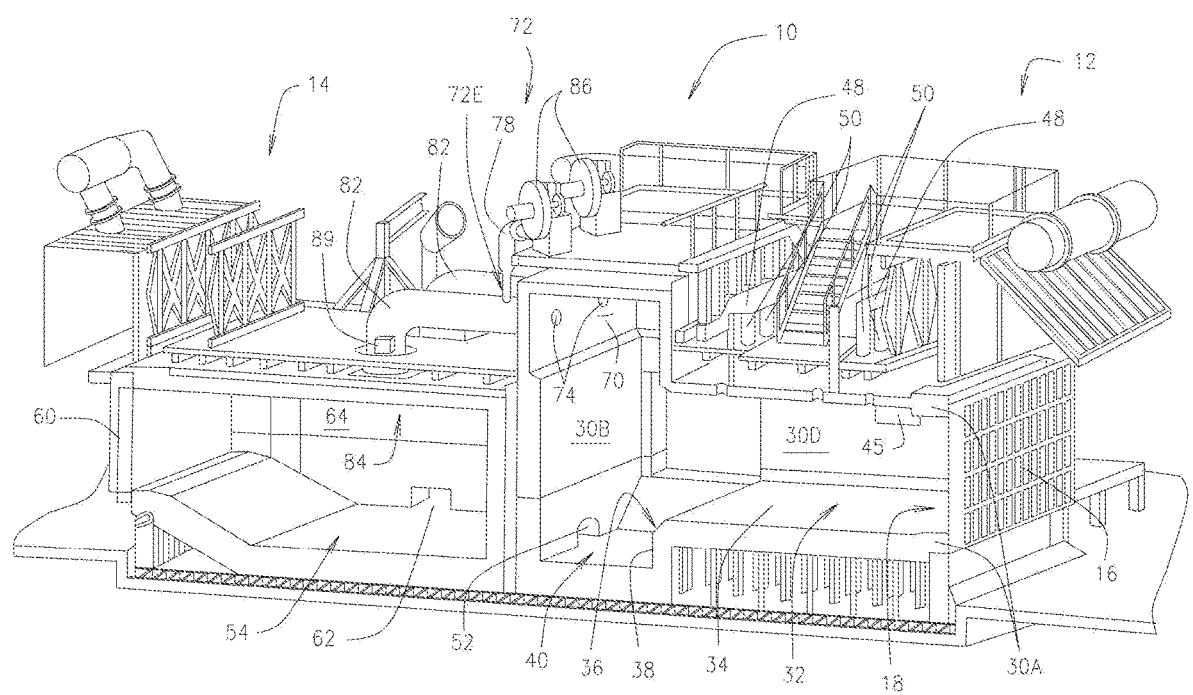
FIG. 1 is a perspective cross-sectional view of a scrap aluminum melt furnace with a delacquering chamber incorporating one embodiment of the present invention.
Figure 2:
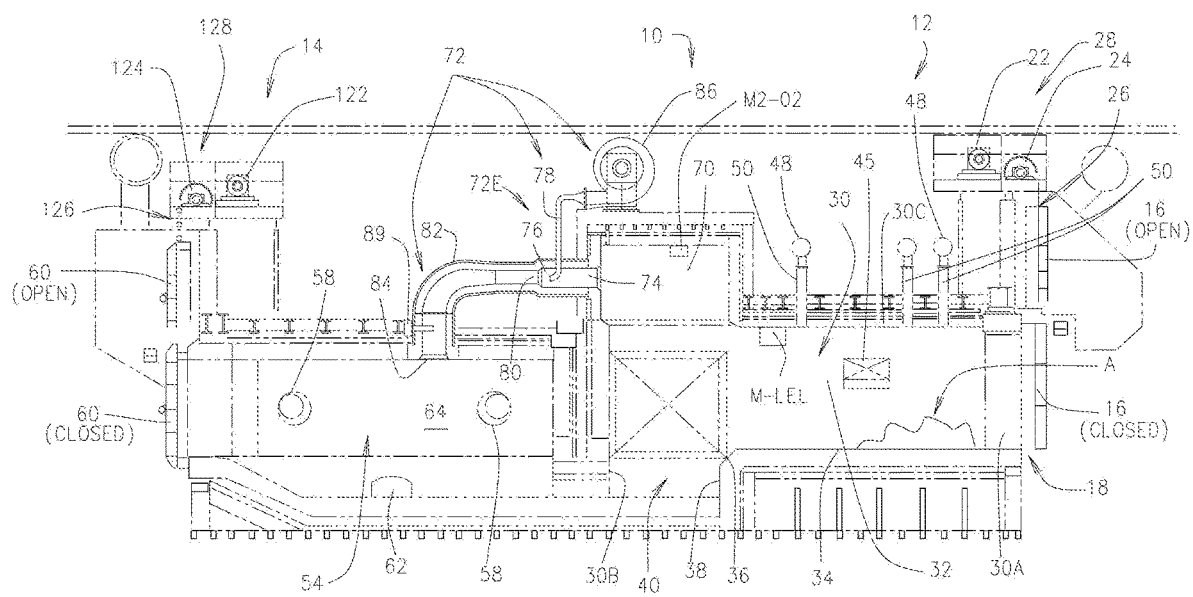
FIG. 2 is a partially diagrammatic cross-sectional plan view of the scrap aluminum melt furnace of FIG. 1.

In referring to the drawings, an embodiment of a representative scrap aluminum delacquering and melt furnace 10 is shown generally in FIGS. 1-2, and 5-6, where the novel volatiles capture eductor system 72 of the present invention is depicted by way of example as integrated into the furnace 10. As can be seen, the furnace 10 has a front end 12 and a back end 14 opposite the front end 12. A vertical, rectangular steel gate or door 16 is positioned, when closed, against a doorway 18 in the front end 12 of the furnace 10. The door 16 is approximately twenty-two feet wide and ten feet tall, and one foot thick. An electric lift motor 22 and associated lift gears 24, are positioned above the door 16 atop the front end of the furnace 10. A set of heavy chains 26 attach at one end to the door 16 and attach at the other end to the lift gears 24. The motor 22, lift gears 24 and chains 26 collectively form an opening system 28 for the door 16. A computer control system CCS for the furnace 10 operatively communicates with the opening system 28 to controllably raise and lower the door 16 between its closed position (as depicted in FIG. 1 and denoted in FIG. 2 as "CLOSED"), in which the door 16 rests against and seals the doorway 18, and its open position in which the door 16 fully exposes the doorway 18 (as depicted and denoted in FIG. 2 as "OPEN").

The doorway 18 opens into a large, generally rectangular delacquering or coated scrap chamber 30 constructed of steel and various refractory materials. The delacquering chamber 30 has a vertical front wall 30A having dimensions of approximately 9 foot high by 24 foot wide, a vertical rear wall 30B opposite the front wall 30A having dimensions of approximately 16 foot high by 24 foot wide, a horizontal ceiling 30C having dimensions of approximately 31 foot deep by 24 foot wide, a first vertical sidewall 30D having dimensions of approximately 9 foot high by 31 foot wide, and a second vertical sidewall 30E opposite the sidewall 30D likewise having dimensions of approximately 9 foot high by 31 foot wide. The front wall 30A includes the doorway 18 and the gate 16.

The delacquering chamber 30 further has a delacquering zone 32 that is approximately twenty feet wide by ten feet tall, and extends approximately twenty feet into the chamber 30 from the doorway 18. The delacquering zone 32 has a relatively flat floor 34 that extends at a slight incline downward from the doorway 18 to a one-foot wide beveled lip 36 that crosses the far end of the floor 34 opposite the doorway 18. Scrap aluminum A is loaded through the doorway 18 onto the floor 34 for initial processing in the chamber 30. The lip 36 slopes downward from the floor 34 at an angle of approximately 45 degrees to a vertical wall 38 that forms the front end of a depressed, generally rectangular pool, known as a "creek bed" 40, at the end of the delacquering chamber 30. The creek bed 40 is approximately two feet deep, twenty feet long and ten feet wide. The creek bed 40 terminates at the vertical rear wall 30B.

Figure 3:
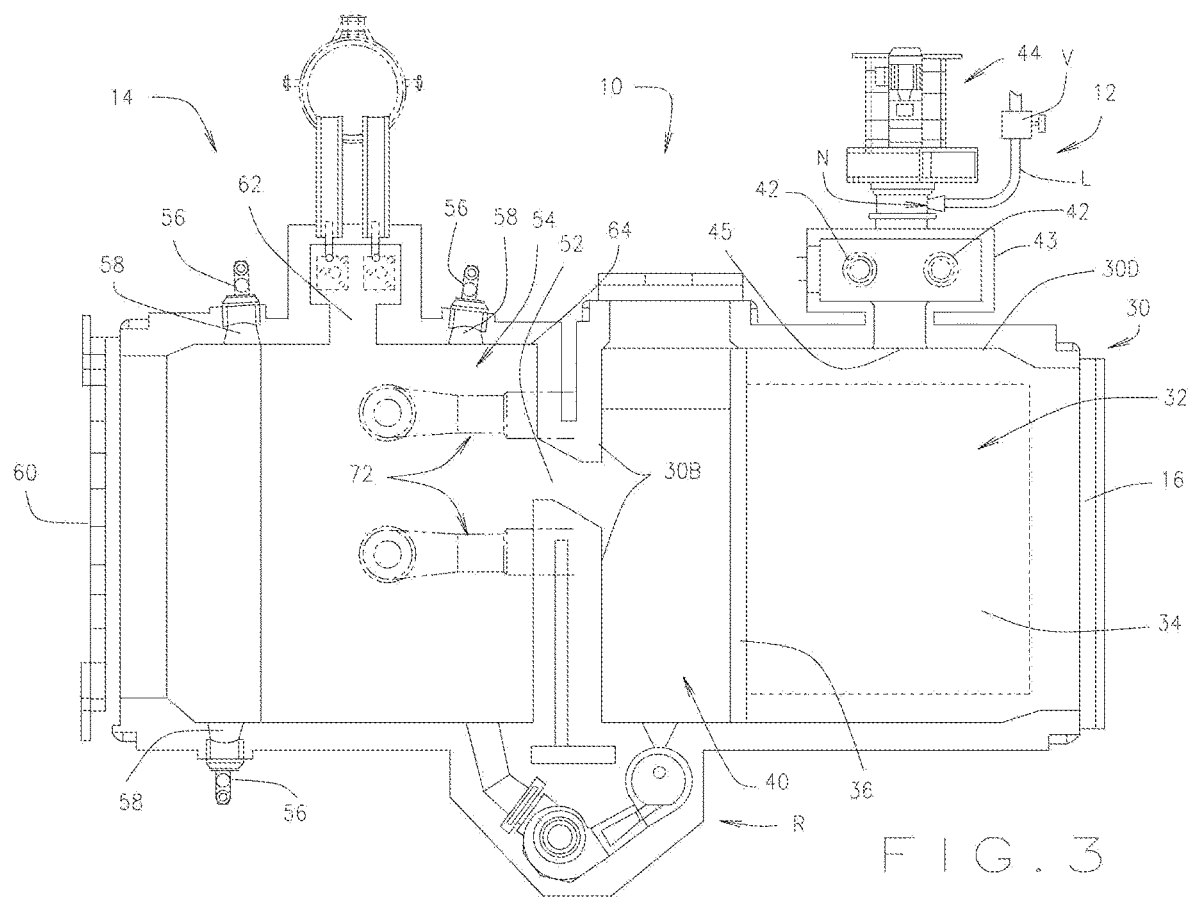
FIG. 3 is a top view of the scrap aluminum melt furnace of FIG. 1.
Figure 4:
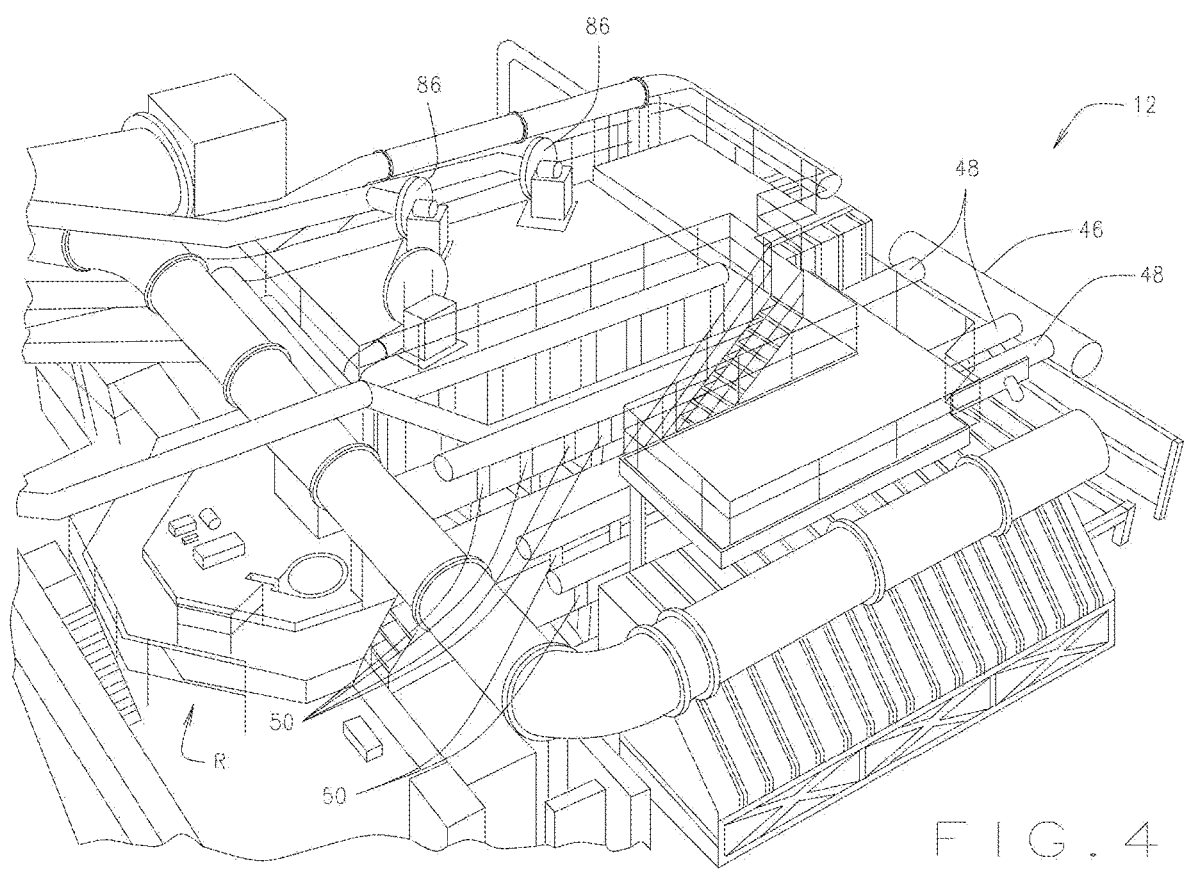
FIG. 4 is an alternate top front perspective view of the front end of the scrap aluminum melt furnace of FIG. 1.
Figure 5:
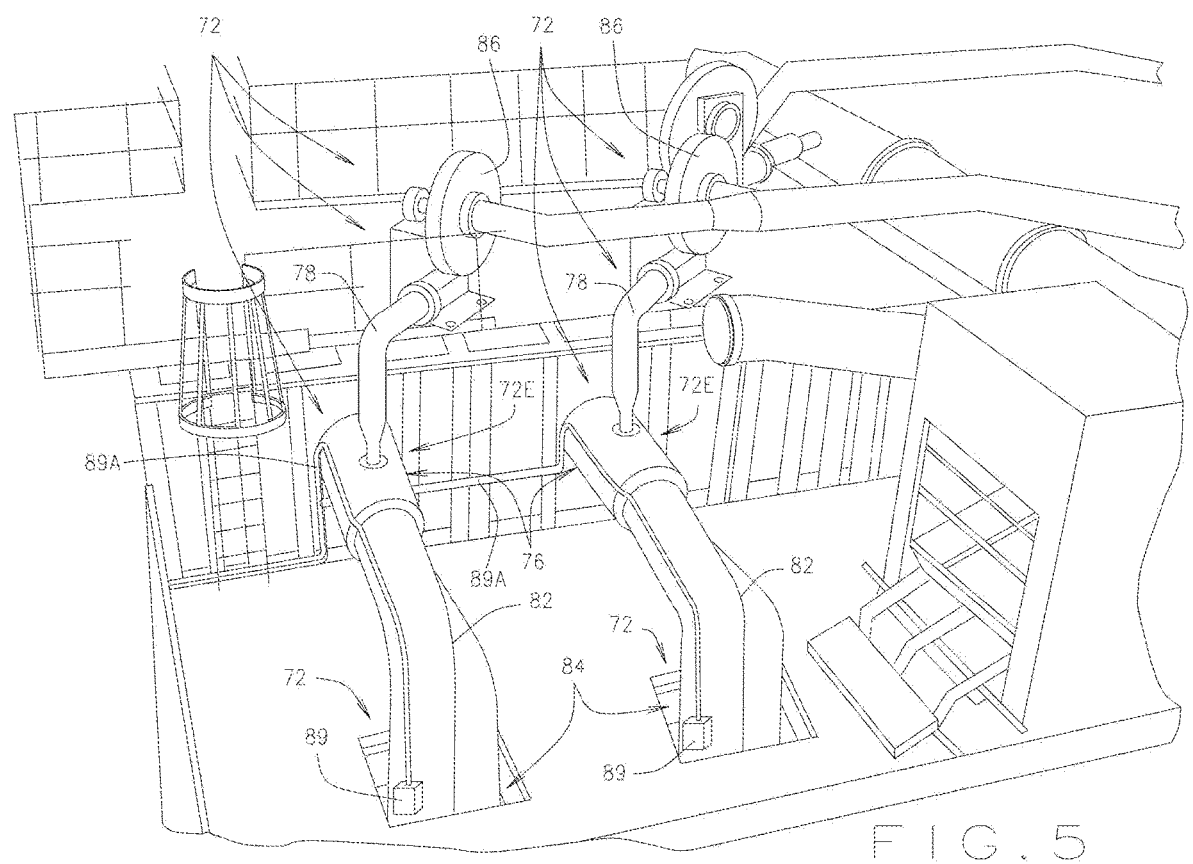
FIG. 5 is an alternate top rear perspective view of the center and back end of the scrap aluminum melt furnace of FIG. 1, showing the eductor systems on top of the furnace.
Figure 6:
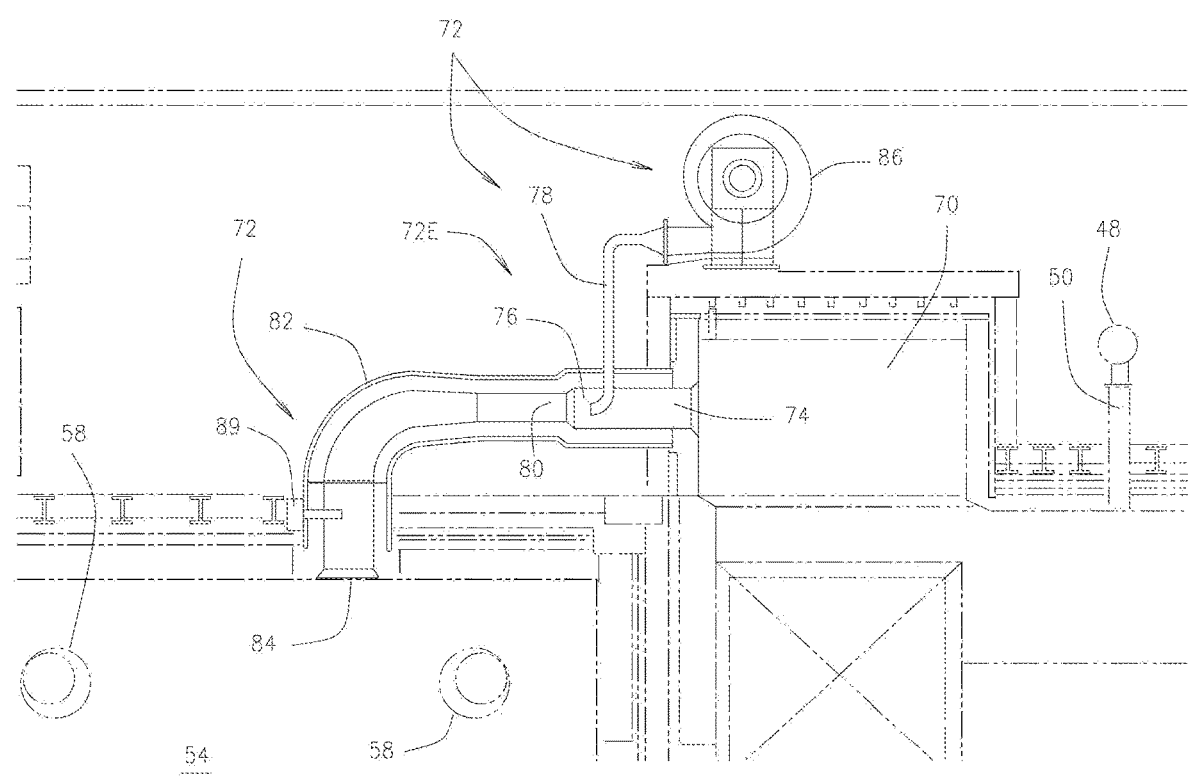
FIG. 6 is a partially diagrammatic enlargement of the upper central portion of FIG. 2.

Referring to FIGS. 3 and 4, it can be seen that a set of gas burners 42, associated with a hot gas generator 43, and a recirculation burner fan 44 are positioned outside the delacquering chamber 30 adjacent the vertical sidewall 30D. The gas burners 42 are positioned on top of, and extend partially into, the hot gas generator 43, such that the heat generated by the gas burners 42 is directed downward into the hot gas generator 43. The recirculation fan 44 draws gases from the delacquering chamber 30 through a square opening 45 in the middle of the sidewall 30C, and into the hot gas generator 43, where such gases are heated to approximately 1000 degrees Centigrade. These gases are heated using gaseous fuel, such as natural gas, which is supplied to the burners 42, to ignite and burn the gaseous fuel and to simultaneously heat the gases drawn from the delacquering chamber 30 in the hot gas generator 43. The recirculation fan 44 then directs the hot exhaust gases exiting the hot gas generator 43 into a cylindrical steel duct manifold 46 positioned above the burners 42 and horizontally next to the top of the furnace 10 above the delacquering chamber 30 (see FIG. 4). The manifold 46 directs the hot exhaust gases from the burners 42 into three smaller cylindrical steel ducts 48 that extend in a parallel fashion over the top of the delacquering chamber 30 above the floor 34. A series of even smaller cylindrical steel ducts 50 extend from each of the ducts 48 downward into and through the top of the delacquering chamber 30, such that the hot exhaust gases are directed downward into the chamber 30 and onto the scrap aluminum A positioned on the floor 34 of the chamber 30.

As can be seen from FIG. 3, a diagonal channel 52 running through the wall 30B connects the creek bed 40 to a second chamber 54 behind the wall 30B. This chamber 54, having dimensions of approximately twenty feet wide and twenty feet long, is known as the "melt chamber" or "heating chamber" where the scrap aluminum A is fully melted and forms a pool of molten metal. A series of various gas fueled burners 56 direct heated exhaust gases through their associated cylindrical refractory ducts 58 into the melt chamber 54 to melt the aluminum in the chamber 54. The burners 56 help elevate the temperature in the melt chamber 54 to over 2,000 degrees Fahrenheit.

A rear gate 60 provides access to the melt chamber 54 for various activities, such as for example repairs, maintenance, upgrades, and cleaning. An electric lift motor 122 and associated lift gears 124, are positioned above the rear door 60 atop the rear end 14 of the furnace 10. A set of heavy chains 126 attach at one end to the top of the door 60 and attach at the other end to the lift gears 124. The motor 122, lift gears 124 and chains 126 collectively form an opening system 128 for the door 60. The computer control system for the furnace 10 operatively communicates with the opening system 128 to controllably raise and lower the door 60 between its closed position (as depicted in FIG. 1 and denoted in FIG. 2 as "CLOSED"), in which the door 60 rests against and seals the rear doorway, and its open position in which the door 60 fully exposes the rear doorway (as depicted and denoted in FIG. 2 as "OPEN").

A channel 62, positioned at the bottom of a sidewall 64 of the melt chamber 54 provides a path for molten aluminum to exit the melt chamber 54 for removal from the furnace 10.

Referring again to FIG. 2, an eductor vacuum hood 70 is positioned directly above and open to the creek bed 40 below. The hood 70 is approximately twenty feet wide, eight feet tall and ten feet deep. Two matching eductor systems 72 are integrated into the hood 70. More particularly, each of the eductor systems 72 has a circular gas suction port 74, a cylindrical refractory gas mixing chamber 76, a cylindrical motive gas tube 78, a cylindrical refractory gas discharge port 80, a variable speed blower 86, and a downstream pilot burner 89 which acts as an igniter. The gas suction port 74, gas mixing chamber 76, motive gas tube 78, and discharge port 80, may be collectively referred to as an "eductor 72E".

The gas suction port 74, motive gas tube 78, and gas discharge port 80 all open into the gas mixing chamber 76 as shown. The motive gas tube 78 has a diameter that is substantially smaller than the diameter of the mixing chamber 76, such that a length of the motive gas tube 78 can be readily positioned inside of the mixing chamber 76. The motive gas tube 78 enters the topside of the mixing chamber 76 where it then turns 90 degrees in the center of the mixing chamber 76 to point downstream away from the gas suction port 74.

Each of the gas suction ports 74 extend through the rear sidewall of the hood 70 to provide a path for exhaust gases and VOC's collected in the hood 70 to be drawn into the eductor mixing chambers 76. A pair of cylindrical steel exhaust channels or ducts 82 connect their respective circular gas discharge ports 80 to the melt chamber 54 and enter the melt chamber 54 through complementary circular openings 84 in the ceiling of the melt chamber 54. Each variable speed blower 86, which is associated with an eductor system 72, is attached to the top of the hood 70 and acts as a gas flow regulator by directing a motive gas into the blower's associated motive gas tube 78, and thereby into the corresponding gas mixing chamber 76, where the motive gas combines with gases from the exhaust hood 70 to form a motive gas mixture. The composition of the motive gas can vary depending upon the design and intended operation of the eductor system 72. That is, the motive gas may be a single type of gas, such as for example Nitrogen, or a mixture of gases, such as for example, the atmosphere proximate the blower 86. Alternatively, the motive gas can be drawn from within the furnace 10, such as for example the melt chamber 54.

As can readily be appreciated, as the variable speed blowers 86 force motive gas through the motive gas tube 78, into the mixing chambers 76 and toward the gas discharge ports 80, a Venturi effect is created in the mixing chambers 76 that creates a vacuum that draws gases from the hood 70, through the gas suction ports 74, into the mixing chambers 76, and out through the gas discharge ports 80.

The variable speed blowers 86 in the eductors are operatively connected to the computer control system CCS for the furnace 10 that collects electronic data representative of gaseous process conditions in each of the eductor systems 72. Program codes in the computer control system CCS utilize this electronic data to increase or decrease the speed of the blower 86 so as to control the flow of motive gas into the motive gas tubes 78, which thereby controls the Venturi effect in the mixing chambers 76, which in turn controls the vacuum draw in the inlet ports 74 to control the draw of exhaust gases and VOC's from the hood 70 through the eductors 72E and into the melt chamber 54.

As can be appreciated, Applicants' aluminum recycling system or furnace 10 utilizes a multi-step process. First, bulk loads or bails of coated aluminum scrap A are fed into the furnace's coated scrap hearth or delacquering chamber 30 through the full-width hearth doorway 18 when the door 16 is in its raised or "OPEN" position. The burners 42 heat the hot gases to approximately 1000 Deg. F and the recirculation fan 44 forces these hot gases down upon the pile of coated scrap aluminum A positioned on the floor 34 of the delacquering chamber 30. These hot gases are introduced into the delacquering chamber 30 above the coated scrap aluminum A. As the scrap aluminum A moves from the doorway 18 to the creek bed 40 across the floor 34, the organics and other non-metal particulates (i.e., the "VOC's") begin to volatilize and are drawn into the vacuum hood 70 by the eductor systems 72, which are initially running at a minimum speed.

After the VOC's have been removed from the scrap aluminum A in the delacquering chamber 30, the scrap aluminum drops into the creek bed 40, where it joins a flow of molten aluminum recirculating from the heating/melt chamber 54. The molten aluminum in the creek bed 40 circulates into the melt chamber 54 through the channel 52 in the rear sidewall 30B of the chamber 30. The molten aluminum is heated in the melt chamber 54 by the heat generated by the burners 56 in combination with the heat provided from the eductor systems 72. A portion of the melted aluminum in the melt chamber 54 is allowed to exit the furnace 10 through the channel 62 for removal from the system, while another portion of the melted aluminum is returned to the creek bed 40 by a recirculating system R (see FIG. 3).

Depending upon the operating conditions in the delacquering chamber 30 of the furnace 10, the blowers 86 for each of the two eductor systems 72 can be ramped up by the computer control system CCS to higher running speeds in order to increase the flow of motive gas into the motive gas tubes 78, which thereby increases the Venturi effect in the mixing chambers 76, which in turn increases the vacuum draw in the inlet ports 74 to increase the draw of exhaust gases and VOC's from the hood 70 through the eductors 72E and into the melt chamber 54. The VOC's drawn into the eductors 72E mix with the motive gas introduced in the mixing chambers 76 by the blowers 86 through the motive gas tubes 78, and are ignited by the pilot burners 89 located in the ducts 82 downstream from the discharge end of the eductors 72E, i.e., proximate the circular openings 80 that open into the ceiling of the melt chamber 54. Each pilot burner 89 has a small gas line 89A that provide an uninterrupted flow of fuel to each pilot burner 89 to ensure it remains alight during operation of the furnace 10. The computer control system CCS also has a process control loop (not shown) that monitors the pilot burners 89 to ensure that they are functioning properly. The ignited gases and VOC's from the eductors 72E "fire down" through the openings 80 onto the molten aluminum/metal bath of the melt chamber 54. The components that work together to control the various gas flows through the eductor system 72 may collectively be called a controllable gas flow subsystem.

An Oxygen monitor M-O2 (see FIG. 7; not shown in FIGS. 1-6) positioned in the exhaust flue for the melt chamber 54 continually monitors Oxygen levels evacuating the chamber 54 and communicates its readings to the computer control system CCS. The CCS adjusts and controls the air/gas ratio of the melt chamber burners 56 to ensure the burning of any residual VOC's before such VOC's exit the chamber 54.

Further, another Oxygen monitor M2-O2 positioned in the hood 70 continually monitors Oxygen levels in the hood 70 over the creek bed 40, generates an electric signal indicative of the Oxygen level in the hood 70, and communicates that electronic signal to the computer control system CCS. This 4-20 mA electric signal reflects a range of 0% to 21% A Oxygen. The Oxygen level in the delacquering chamber 30 will have a predetermined "low O2" set-point between 0-6% to prevent combustion from occurring in the delaquering chamber 30. The burner fuel-mix ratios for each of the burners 42 in the hot gas generator 43 are adjusted and controlled by the computer control system CCS based upon the Oxygen level measured in the hood 70 by the monitor M2-O2, so as to maintain a desired Oxygen level within the delacquering chamber 30. Programmed limits will prevent the burners 42 from firing outside of acceptable Oxygen ratio limits.

Finally, a lower explosive limit ("LEL") monitor M-LEL, located in the delacquering chamber 30, detects the explosive level of the atmosphere within the delacquering chamber 30, and communicates that LEL level to the computer control system CCS. In the event that the LEL reading exceeds a predetermined "safe" level, the computer control system CCS recognizes an alarm state in the furnace 10 and opens an electronically controlled gas shut-off valve V connected to a Nitrogen supply line attached to the furnace 10 (see FIG. 3), so as to automatically inject Nitrogen gas into the delacquering chamber 30 to reduce the LEL level and minimize the risk of explosion in the chamber 30. The Nitrogen gas is injected through an inlet gas port N proximate the recirculation fan 44. This results in generally even distribution of Nitrogen gas throughout the entire delacquering chamber 30. Of course, the Nitrogen can be injected at nearly any position in the system so long as sufficient Nitrogen reaches the chamber 30 to rapidly compensate for an excessive LEL reading. Of course, other neutral gases or neutral gas mixtures can be used in place of Nitrogen. When such an event occurs, the furnace doors 16 and 60 will both be automatically locked by the computer control system CCS during such high LEL event, and will not be allowed to open until the LEL reading has been reduced to a safe level.

While we have described in the detailed description a configuration that may be encompassed within the disclosed embodiments of this invention, numerous other alternative configurations, that would now be apparent to one of ordinary skill in the art, may be designed and constructed within the bounds of our invention as set forth in the claims. Moreover, the above-described novel volatiles capture eductor system 72 for a metal recycle furnace 10 of the present invention can be arranged in a number of other and related varieties of configurations without expanding beyond the scope of our invention as set forth in the claims.

For example, the eductor system 72 is not necessarily required to be installed in an aluminum delacquering and recycling system 10 as depicted in the Figures, but may be installed or otherwise incorporated into a variety of configurations of metal recycling furnace and kiln systems. Further, the eductor system 72 is not constrained to the specific eductor configuration 72E as shown in this disclosure, but may instead comprise various shapes, sizes and may be located at different positions on the furnace 10, so long as the eductor(s) adequately perform the function of controllably removing exhaust gases and VOC's from the delacquering chamber, igniting those gases and VOC's, and directing that heat into the melt or heating chamber. Similarly, it is not required that the furnace 10 be equipped with exactly two eductor systems 72. Rather, the furnace 10, and for that matter other furnaces and kilns using the unique system presented here, may incorporate various numbers of eductor systems 72, so long as the eductor system(s) adequately perform the function of controllably removing exhaust gases and VOC's from the delacquering chamber, igniting those gases and VOC's, and directing that heat into the melt or heating chamber.

In addition, the eductor system 72 can be operated or controlled by a variety of methods and control systems, so long as the eductor system 72 adequately performs the function of controllably removing exhaust gases and VOC's from the delacquering chamber, igniting those gases and VOC's, and directing that heat into the melt of heating chamber. That is, the eductor system 72 can be controlled by various mechanical and/or electronic and/or computerized control systems. For example, an eductor system 72 can be controlled by a preset or programmable computer ("CPU") that is remote from the eductor system 72 but independent of the computer control system CCS, and is connected to monitors, such as for example one of the oxygen monitors in the system, and to controllable components, such as for example the variable speed blower 86, such that the CPU can collect operational data from the monitor(s), and input that data into a program in the CPU to automatically control the speed of the blower 86 to predictably control the amount of exhaust gases and VOC's pulled into the eductor system 72 from the hood 70. Such a CPU can be connected to the eductor(s) 72E by hardwire or wirelessly.

Further, each eductor system 72 can be independently controlled by on "onboard" system, or multiple eductors can be controlled by a common "local" control system. Such electronic and/or computerized control systems can be connected to the eductor(s) 72 by hardwire or wirelessly.

Moreover, other means can be utilized to conduct or force the motive gas into the eductor 72E other than a variable speed blower 86. For example, a single speed blower can be used by controlling the timing of the ON and OFF conditions for such a blower. By way of another example, the eductor system 72 can utilize a variable pumping mechanism in place of the variable speed blower 86.

Also, the variation in gas flow through the eductor 72E can be achieved through the use of various gas flow regulators instead of changing the speed of the variable speed blower 86. For example, an automated mechanical variable nipple can be attached to the end of the motive gas tube 78, or a mass flow controller or a controllable gate valve or a variable gas flow filter can be placed in any one or more of the inlet port 74, the mixing chamber 76, the motive gas tube 78, or the gas discharge port 80. Any one or more of these types of controllers can be connected to and operated by the computer control system CCS and/or any of the alternate electronic control systems described herein.

Additional variations or modifications to the configuration of the above-described novel volatiles capture eductor system 72 for a metal recycle furnace 10 of the present invention may occur to those skilled in the art upon reviewing the subject matter of this invention. Such variations, if within the spirit of this disclosure, are intended to be encompassed within the scope of this invention. The description of the embodiments as set forth herein, and as shown in the drawings, is provided for illustrative purposes only and, unless otherwise expressly set forth, is not intended to limit the scope of the claims, which set forth the metes and bounds of our invention.

What is claimed is:

1. A volatiles consuming eductor system for a coated scrap metal furnace, said furnace having a delacquering chamber and a melt chamber separated from said delacquering chamber, said system comprising:
   a. a gas mixing chamber positioned between said delacquering chamber and said melt chamber;
   b. a gas suction port, said gas suction port having a first end and a second end, said first end opening into said delaquering chamber, said second end opening into said gas mixing chamber, said gas suction port providing a gaseous conduit between said delaquering chamber and said gas mixing chamber;
   c. a motive gas inlet, said motive gas inlet opening into said gas mixing chamber, said motive gas inlet injecting a motive gas into said mixing chamber and directing said motive gas in a direction away from said gas suction port, said directed motive gas creating a Venturi in said mixing chamber, said Venturi drawing exhaust gases and volatiles from said delaquering chamber and into said mixing chamber, said exhaust gases and volatiles from said delaquering chamber mixing with said motive gas in said mixing chamber to form an eductor gas mixture;
   d. a gas discharge port, said gas discharge port having a first end and a second end, said first end opening into said gas mixing chamber, said second end opening into said melt chamber, said gas discharge port providing a gaseous conduit between said gas mixing chamber and said delaquering chamber, said gas discharge port directing said eductor gas mixture out of said gas mixing chamber and into said melt chamber; and
   e. an igniter, said igniter positioned proximate said gas discharge port in communication with said eductor gas mixture, said gas igniting said eductor gas mixture.

2. The volatiles consuming eductor system of claim 1, further comprising a controller, said controller providing regulation of one or more of: (i) the flow of said motive gas into said gas mixing chamber; (ii) the flow of said exhaust gases and volatiles through said gas suction port; and (iii) the flow of said eductor gas mixture into said melt chamber.

3. The volatiles consuming eductor system of claim 2, wherein said controller comprises a computer processor, said computer processor utilizing computer code to control said regulation.

4. The volatiles consuming eductor system of claim 2, wherein said furnace comprises a computer control system, said computer control system being in communication with said controller, said computer control system utilizing computer code to control said regulation through said communication with said controller.

5. The volatiles consuming eductor system of claim 2, wherein said controller comprises a blower, said blower being in communication with said controller, said blower forcing said motive gas through said motive gas inlet into said gas mixing chamber, said controller controlling the operation of said blower to regulate said flow of said motive gas into said gas mixing chamber.

6. The volatiles consuming eductor system of claim 5, wherein said blower comprises a variable speed control apparatus, said variable speed control apparatus regulating the rate at which said blower forces said motive gas through said motive gas inlet, said controller communicating with and controlling said variable speed control apparatus.

7. The volatiles consuming eductor system of claim 2, wherein said controller further comprises a gas regulator, said gas regulator providing at least in part said regulation.

8. The volatiles consuming eductor system of claim 7, wherein said gas regulator comprises one or more of: (i) a mass flow controller; (ii) a gas valve; and (iii) a variable gas filter.

9. The volatiles consuming eductor system of claim 2, wherein said controller further comprises a sensor, said sensor detecting one or more gas flow conditions in one of: (i) said gas mixing chamber; (ii) said gas suction port, and (iii) said gas mixing chamber; said sensor generating an electronic signal indicative of said one or more gas flow conditions and communicating said signal to said controller.

10. A volatiles consuming eductor system for a coated scrap metal furnace, said furnace having a delacquering chamber and a melt chamber separated from said delacquering chamber, said furnace having a computer control system, said volatiles consuming eductor system comprising:
   a. a gas mixing chamber positioned between said delacquering chamber and said melt chamber;
   b. a gas suction port, said gas suction port having a first end and a second end, said first end opening into said delaquering chamber, said second end opening into said gas mixing chamber, said gas suction port providing a gaseous conduit between said delaquering chamber and said gas mixing chamber;
   c. a motive gas inlet, said motive gas inlet opening into said gas mixing chamber, said motive gas inlet injecting motive gas into said mixing chamber and directing said motive gas in a direction away from said gas suction port, said directed motive gas creating a Venturi in said mixing chamber, said Venturi drawing exhaust gases and volatiles from said delaquering chamber and into said mixing chamber, said gases and volatiles from said delaquering chamber mixing with said motive gas in said mixing chamber to form an eductor gas mixture;
   d. a gas discharge port, said gas discharge port having a first end and a second end, said first end opening into said gas mixing chamber, said second end opening into said melt chamber, said gas discharge port providing a gaseous conduit between said gas mixing chamber and said delaquering chamber, said gas discharge port directing said eductor gas mixture out of said gas mixing chamber and into said melt chamber; and
   e. an igniter, said igniter positioned proximate said gas discharge port in communication with said eductor gas mixture, said gas igniting said eductor gas mixture;
   f. a controllable gas flow subsystem, said subsystem providing controllable gas flow regulation of one or more gases in said volatiles consuming eductor system.

11. The volatiles consuming eductor system of claim 10, wherein said controllable gas flow subsystem communicates with said furnace computer control system, said computer control system utilizing computer code to control said gas flow regulation.

12. The volatiles consuming eductor system of claim 10, wherein said controllable gas flow subsystem provides regulation of one or more of: (i) the flow of said motive gas into said gas mixing chamber; (ii) the flow of said exhaust gases and volatiles through said gas suction port; and (iii) the flow of said eductor gas mixture into said melt chamber.

13. The volatiles consuming eductor system of claim 10, wherein said controllable gas flow subsystem comprises a gas flow regulator, said subsystem automatically operating said regulator to control said gas flow regulation, said regulator comprising one or more of: (i) a variable speed blower; (ii) a mass flow controller; (iii) a gas valve; and (iv) a variable gas filter.

14. An automated volatiles consumption system for a coated scrap metal furnace, said furnace having a delacquering chamber and a melt chamber separated from said delacquering chamber, said furnace having a computer control system, said automated volatiles consumption system comprising:
   a. an eductor system having a gas suction port, a gas mixing chamber, a motive gas inlet, and a gas discharge port; said gas mixing chamber being positioned between said delacquering chamber and said melt chamber; said gas suction port opening into said delaquering chamber and said gas mixing chamber; said gas suction port providing a gaseous conduit between said delaquering chamber and said gas mixing chamber; said motive gas inlet opening into said gas mixing chamber and injecting a motive gas into said mixing chamber in an orientation directed away from said gas suction port; said directed motive gas creating a Venturi in said mixing chamber; said Venturi drawing exhaust gases and volatiles from said delaquering chamber and into said mixing chamber; said gases and volatiles from said delaquering chamber mixing with said motive gas in said mixing chamber to form an eductor gas mixture; said gas discharge port opening into said gas mixing chamber and said melt chamber; said gas discharge port providing a gaseous conduit between said gas mixing chamber and said melt chamber; said gas discharge port providing a gaseous conduit between said gas mixing chamber and said melt chamber; said gas discharge port directing said eductor gas mixture out of said gas mixing chamber and into said melt chamber;
   b. an igniter, said igniter positioned proximate said gas discharge port in communication with said eductor gas mixture, said gas igniting said eductor gas mixture;
   c. an electronic gas flow control loop, said control loop comprising a computer processor, an electronic sensor positioned in said eductor system, and a gas flow regulator positioned in said eductor system; said gas flow regulator controlling the flow of one or more gases in said eductor system; said sensor measuring a first process condition in said eductor system, generating an electronic signal indicative of said first process condition, and communicating said electronic signal to said computer processor; said computer processor controlling said gas flow regulator in response to said electronic signal.

15. The automated volatiles consumption system of claim 14, wherein said gas flow regulator comprises one of: a variable speed blower; a mass flow controller; a gas valve; and a variable gas filter.

16. The automated volatiles consumption system of claim 14, wherein said electronic sensor measures a first flow condition for a first gas in said eductor system, generates an electronic signal indicative of said first flow condition, and communicates said electronic signal to said computer processor, said computer processor controlling said regulator in response to said electronic signal.

17. The automated volatiles consumption system of claim 16, wherein said first gas comprises said motive gas.

18. The automated volatiles consumption system of claim 15, wherein said electronic sensor measures a first temperature in said eductor system, generates an electronic signal indicative of said first temperature, and communicates said electronic signal to said computer processor, said computer processor controlling said regulator in response to said electronic signal.

19. The automated volatiles consumption system of claim 18, wherein said electronic sensor measures a first temperature proximate one of: (i) said gas suction port; (ii) said gas mixing chamber; (iii) said gas suction port, and (iv) said gas mixing chamber.

20. The automated volatiles consumption system of claim 14, wherein said electronic gas flow control loop communicates with said furnace computer control system, said computer control system utilizing computer code to control said gas flow regulator.

* * * * *